Oct. 7, 1941.                    R. C. BAKER                    2,257,996
                          VERTICAL DIRECTIONAL DEVICE
                            Filed March 18, 1940

Inventor
REUBEN C. BAKER,
By Oscar A. Mellin
Attorney

Patented Oct. 7, 1941

2,257,996

UNITED STATES PATENT OFFICE 2,257,996

VERTICAL DIRECTIONAL DEVICE

Reuben C. Baker, Coalinga, Calif., assignor to Baker Oil Tools, Inc., Los Angeles, Calif., a corporation of California Application March 18, 1940, Serial No. 324,487

10 Claims. (Cl. 33—221)

The present invention relates to vertical directional devices, and is particularly concerned with the pivotal supporting of plumb bobs subjected to forces in addition to that produced by gravity.

In certain apparatus, plumb bobs or other inertia members are employed as controlling or indicating instrumentalities operating in connection with other parts of the apparatus in the performance of their required functions. The plumb bobs must be pivoted for universal movement, with their pivot mountings capable of withstanding thrusts imposed on the plumb bobs as an incident of their operation. The prior art devices meet the thrust requirements, but in doing so they subject the plumb bobs to undue frictional resistance, impairing their freedom of universal movement under the influence of gravity, and their sensitivity and accuracy of control or indication.

It is an object of the present invention to provide a plumb bob device having a universal mounting practically devoid of frictional resistance when the plumb bob is acted upon by gravity alone, the mounting nevertheless being capable of withstanding and transmitting large thrusts or forces imposed upon the plumb bob from other sources.

This invention has other objects that will become apparent from a consideration of the embodiment shown in the drawing accompanying and forming part of the present specification. This form will now be described in detail, but it is to be understood that such detailed description is not to be taken in a limited sense since the scope of the invention is best defined by the appended claims.

Referring to the drawing.

Figure 1:
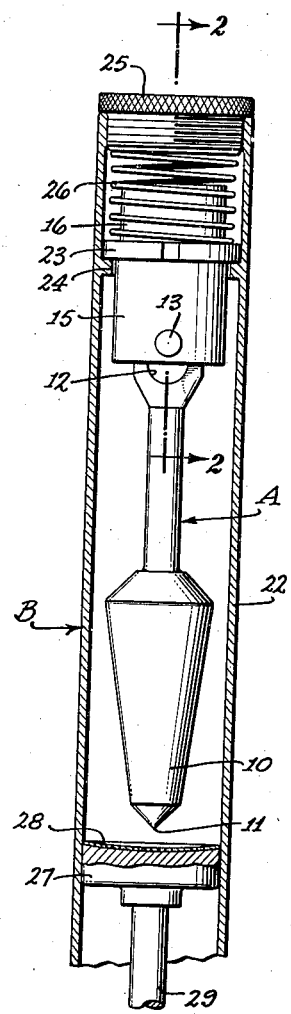
Figure 1 is an elevation of a vertical directional device, shown as forming part of a well surveying instrument.

The device illustrated in the drawing consists of a plumb bob A having a weight 10 at its lower end, which terminates in a point 11. The upper portion of the plumb bob has an enlarged opening 12 through which passes a stationary shaft 13 received within aligned bores 14, 14 provided in a sleeve 15 threadedly secured to a bearing supporting member 16. The shaft can be non-rotatably secured to the sleeve by the use of various devices, in the present instance having a drive fit within the bores 14, 14.

A conical recess or seat 17 is formed in the upper surface of the shaft for the purpose of receiving the needle point 18 of a pivot screw 19 threaded in the spherical head 20 of the plumb bob. The apex angle of the recess is greater than that of the needle point to permit the plumb bob unrestrained and universal movement by allowing only point contact between the screw and the shaft.

When employed in certain types of apparatus, the plumb bob A is subjected to forces other than that due to gravity, which pass initially either from the bearing support 16 to the plumb bob or in a reverse direction. In order to provide a large bearing surface to withstand such forces or thrusts and to permit their transmittal regardless of the angularity of the plumb bob with respect to its supporting mechanism, the lower end of the bearing support has a spherical socket 21 confining the similarly shaped head 20 of the plumb bob.

Figure 2:
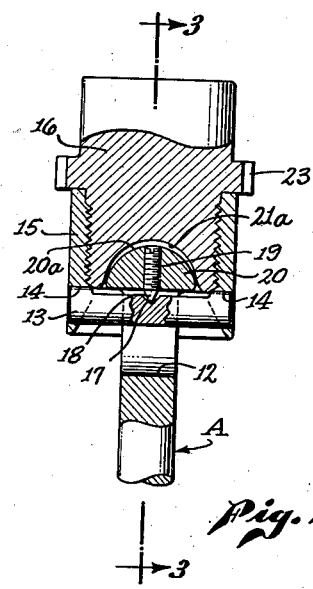
Figure 2 is an enlarged longitudinal section taken along the line 2—2 of Figure 1.
Figure 3:
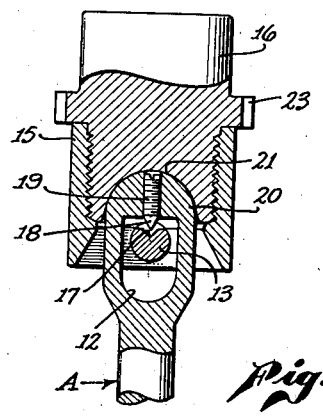
Figure 3 is a longitudinal section taken along the line 3—3 of Figure 2, with the parts shown in a different relative position.

When the plumb bob is in its freely hanging position, the needle point 18 rests in the conical recess 17 and the plumb bob can pivot freely in all directions and with practically no frictional resistance, for when the parts are in this position, the spherical surface 20a of the plumb bob head is spaced slightly from the mating surface 21a of the spherical socket, as shown in Figure 2. However, upon translation of the plumb bob A longitudinally toward the bearing support 16, its spherical head will contact and seat within the bearing supporting member socket (Figure 3), and since the two surfaces 20a, 21a have substantially the same radius of curvature, the parts contact over a large area, minimizing the unit bearing load and giving the device a large capacity. When the parts are in this position, the needle point 18 is raised from its conical recess 17, but as soon as the thrust urging the plumb bob head against its socket is removed, the force of gravity will act upon the plumb bob or pendulous weight A to reposition the needle point into contact with the apex of the conical recess.

As an exemplification of its utility, the arrangement described above is shown in Figure 1 as forming part of a surveying instrument B. It is to be understood, however, that the invention has other uses than that specifically indicated.

The plumb bob device is positioned within a casing or cylinder 22, with a flange 23 on its bearing support 16 resting upon a cooperable flange 24 extending inwardly from the casing. The top of the casing is closed with a plug 25 threaded thereinto, against which an end of a helical spring 26 abuts, its other end engaging the bearing support flange 23 and normally holding it against the casing flange 24.

Initially spaced below the freely suspended plumb bob is a piston 27 carrying a record disc or chart 28, possessing suitable indicia thereon representing the degree of inclination of the well bore from the vertical. The upper surfaces of the piston and the disc or chart are spherical in shape, having a radius of curvature equal to the distance between the needle point 18 and the point 11 at the lower end of the plumb bob, in order to permit the obtaining of an accurate indication regardless of the angularity of the plumb bob and the position of its point 11 over the disc or chart surface.

With the parts shown in Figure 1, the surveying instrument is lowered into the bore hole or string of drill pipe. When the desired point is reached, the plumb bob A is permitted to come to rest and the piston 27 moved upwardly through some control or timing device (not shown) connected to a rod 29 attached to the piston. In moving upwardly, the disc 28 is marked or punctured by contacting the point 11 of the plumb bob, thereafter carrying the plumb bob upwardly until its spherical head 20 engages the spherical socket 21. The thrust exerted by the piston 27 on the plumb bob is then transmitted to the bearing support 16 through the spherical surfaces 20a, 21a without imposing any load on the raised needle point 18. If the thrust is substantial, the bearing support will yield against the action of the helical spring 26.

It is thus apparent that the present invention insures substantially frictionless universal pivoting of the plumb bob with respect to its supporting members when it is influenced by gravity alone, while providing a large load bearing capacity for transmitting thrusts between the plumb bob and its supporting members regardless of their relative angularity.

I claim:

1. A device of the character described, including a plumb bob, supporting means for the plumb bob, a needle on said plumb bob providing a point bearing contact between said plumb bob and supporting means to permit the plumb bob to pivot freely when solely under the influence of gravity, means providing a spherical surface of contact between said plumb bob and supporting means when said point bearing contact is disrupted to transmit bearing loads therebetween irrespective of their angular positions with respect to one another, and means for elevating said plumb bob to disrupt said point bearing contact and establish said surface contact.

2. In combination, a plumb bob, supporting means for the plumb bob, means providing a single point bearing contact between said plumb bob and supporting means to permit the plumb bob to pivot freely in all directions under the influence of gravity, normally spaced means adapted to provide a spherical surface of contact between said plumb bob and supporting means, and means for elevating said plumb bob to engage said normally spaced means and disrupt said point bearing contact.

3. A device of the character described, including a plumb bob having a spherically shaped head and needle point, supporting means for said plumb bob provided with a spherical socket receiving said head and comprising a transverse member extending freely through an opening in said plumb bob, said needle point resting on said transverse member and said spherical head and socket being in spaced relation when said plumb bob is under the sole influence of gravity, said spherical head and socket having surface contact when said needle point is elevated from said transverse member.

4. A device of the character described, including a plumb bob, supporting means for said plumb bob, a ball and socket joint for transmitting thrusts between said plumb bob and supporting means, and a needle point and cooperable seat between said plumb bob and supporting means, said needle point engaging its seat when said ball and socket elements are out of contact, and means for elevating said plumb bob to disengage the needle point from its seat and establish contact between said ball and socket elements.

5. A device of the character described, including a plumb bob having a spherically shaped head, a bearing support having a spherical socket for receiving said head, a shaft carried by said support and extending transversely freely through said plumb bob, a pivot on said head provided with a point engageable with a seat on said shaft, said point engaging said seat when said head is out of contact with the socket, said point being raised from its seat when contact between said head and socket is to be established.

6. A device of the character described, including a plumb bob having a spherically shaped head, a bearing support having a spherical socket for receiving said head, a shaft carried by said support and extending transversely freely through an opening in said plumb bob, a pivot screw threaded in said head, said screw being provided with a point extending into said opening and engageable with a seat on said shaft, said point resting on said seat with said head out of contact with said socket, said head engaging its socket upon elevation of said point with respect to its seat.

7. A device of the character described, including a plumb bob having a spherically shaped head at its upper end, a bearing support having a spherical socket for receiving said head, a sleeve threaded onto said bearing support, a shaft carried by said sleeve and extending freely through an opening in said plumb bob, a pivot screw threaded through said head with a point extending downwardly into said opening for engagement with a seat formed upon said shaft, said point resting on said seat with said head out of contact with said socket, said head engaging its socket upon elevation of said point with respect to its seat.

8. A device of the character described, including a plumb bob having a spherically shaped member, supporting means for said plumb bob provided with a spherical socket for receiving said member and comprising a transverse member extending freely through an opening in said plumb bob, one of said members having a needle point and the other having a seat for receiving said needle point, and said spherical member and socket being in spaced relation when said plumb bob is under the sole influence of gravity, said spherical member and socket having surface contact when said needle point is disengaged from its seat.

9. A device of the character described, including a plumb bob having a spherically shaped head and needle point, supporting means for said plumb bob provided with a spherical socket for receiving said head and a conical seat in fixed relation with respect to said socket for receiving said needle point, said needle point resting on said seat and said spherical head and socket being in spaced relation when said plumb bob is under the sole influence of gravity, and means for elevating said plumb bob to raise its needle point from its seat and engage said head and socket, said socket and seat being separated by a distance which allows sufficient elevation of said needle point from said seat to permit said plumb bob to occupy various angular positions with its head engaging said socket without contact between said point and the inclined sides of said conical seat.

10. A device of the character described, including plumb bob means having a spherically shaped head, supporting means for said plumb bob means provided with a spherical socket for receiving said head, one of said means having a needle point and the other having a conical seat for receiving said needle point, said spherical member and socket being in spaced relation when said needle point and seat are engaged and said plumb bob means is under the sole influence of gravity, and means for elevating said plumb bob means to disrupt the contact between said needle point and seat and engage said spherical member and socket, said spherically shaped member and socket being separated by a distance which allows sufficient elevation of said plumb bob means and separation between said needle point and seat to permit said plumb bob means to occupy various angular positions with its head engaging said socket without contact of said point with the inclined sides of said conical seat.

REUBEN C. BAKER.